(12) United States Patent
Nam et al.

(10) Patent No.: US 9,680,624 B2
(45) Date of Patent: *Jun. 13, 2017

(54) METHOD AND SYSTEM FOR MAPPING UPLINK CONTROL INFORMATION

(71) Applicant: Samsung Electronics Co., Ltd., Suwon-si, Gyeonggi-do (KR)

(72) Inventors: Young-Han Nam, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

This patent is subject to a terminal disclaimer.

(21) Appl. No.: 14/675,224

(22) Filed: Mar. 31, 2015

(65) Prior Publication Data

US 2015/0207609 A1    Jul. 23, 2015

Related U.S. Application Data

(63) Continuation of application No. 14/188,219, filed on Feb. 24, 2014, now Pat. No. 8,995,555, which is a
(Continued)

(51) Int. Cl.
*H04L 5/00* (2006.01)
*H04L 1/00* (2006.01)
(Continued)

(52) U.S. Cl.
CPC ......... *H04L 5/0057* (2013.01); *H04B 7/0456* (2013.01); *H04B 7/0486* (2013.01);
(Continued)

(58) Field of Classification Search
None
See application file for complete search history.

(56) References Cited

U.S. PATENT DOCUMENTS 8,417,190 B2* 4/2013 Sun ............. H04W 72/04 370/252
8,792,534 B2  7/2014 Ogawa et al.
(Continued)

FOREIGN PATENT DOCUMENTS

| WO | WO 2010/011083 A2 | 1/2010 |
| WO | WO 2010/107779 A2 | 9/2010 |
| WO | WO 2011/099282 A1 | 8/2011 |

OTHER PUBLICATIONS

Chinese Office Action issued for CN 2011800287631 dated Feb. 19, 2016, 28 pgs.
(Continued)

*Primary Examiner* — Min Jung

(57) ABSTRACT

An uplink grant transmitted to a subscriber station indicates a first modulation and coding scheme (MCS) value for a first codeword transmission and a second MCS value for a second codeword transmission. A multiple-input multiple-output (MIMO) uplink subframe received from the subscriber station has a first subset of layers used for first codeword transmission and a second subset of layers used for second codeword transmission. Rank indication (RI) information is mapped onto both the first subset of layers and the second subset of layers. Channel quality information (CQI) is only mapped onto either the first subset of layers or the second subset of layers. If the first MCS value is different from the second MCS value, the CQI is mapped onto the subset of layers having a higher MCS value.

20 Claims, 7 Drawing Sheets

Related U.S. Application Data continuation of application No. 13/071,284, filed on Mar. 24, 2011, now Pat. No. 8,670,496.

(60) Provisional application No. 61/324,231, filed on Apr. 14, 2010.

(51) Int. Cl.

| | | |
|---|---|---|
| *H04L 1/18* | (2006.01) | |
| *H04L 25/03* | (2006.01) | |
| *H04B 7/0456* | (2017.01) | |
| *H04B 7/04* | (2017.01) | |
| *H04L 1/16* | (2006.01) | |

(52) U.S. Cl.
CPC .......... *H04L 1/0031* (2013.01); *H04L 1/1861* (2013.01); *H04L 5/0023* (2013.01); *H04L 5/0026* (2013.01); *H04L 5/0048* (2013.01); *H04L 5/0055* (2013.01); *H04L 25/03929* (2013.01); *H04L 1/0073* (2013.01); *H04L 1/1671* (2013.01)

(56) References Cited

U.S. PATENT DOCUMENTS

| 8,958,494 | B2* | 2/2015 | Beluri | H04B 7/0417 |
|---|---|---|---|---|
| | | | | 375/260 |
| 2012/0213187 | A1* | 8/2012 | Yang | H04L 1/0027 |
| | | | | 370/329 |
| 2013/0336256 | A1 | 12/2013 | Chung et al. | |
| 2015/0071238 | A1* | 3/2015 | Seo | H04L 1/0026 |
| | | | | 370/329 |
| 2015/0156770 | A1 | 6/2015 | Beluri et al. | |

OTHER PUBLICATIONS

Translation of Chinese Second Office Action, dated Jul. 13, 2015, in connection with Chinese Patent Application No. 2011800287631, 26 pages.

3GPP TSG RAN WG1 60bis, "Data and Control Multiplexing for UL Multi-Antenna Transmission", R1-102108, Apr. 12-16, 2010, Beijing, China, 4 pages.

Translation of Japanese Grant dated Oct. 9, 2015, in connection with Japanese Patent Application No. 2013-504831, 7 pages.

3GPP TSG RAN WG1 #59bis, "Multiplexing of control and data in multi-layer PUSCH transmission", R1-100261, Jan. 18-22, 2010, Valencia, Spain, 7 pages.

3GPP TSG RAN WG1 #60bis, "UCI transmission on PUSCH with SU-MIMO", R1-101905, Apr. 12-16, 2010, Beijing, P.R. China, 3 pages.

3GPP TSG RAN WG1 #60bis, "Data and Control Multiplexing for UL Multi-Antenna Transmission", R1-102108, Apr. 12-16, 2010, Beijing, P.R. China, 5 pages.

3GPP TSG RAN WG1 #60bis, "UCI Multiplexing on PUSCH with MIMO Transmission", R1-101818, Apr. 12-16, 2010, Beijing, P.R. China, 4 pages.

3GPP TSG RAN WG1 #61, "Performance evaluation of UCI multiplexing schemes on PUSCH in case of SU-MIMO", R1-102962, May 10-14, 2010, Montreal, Canada; 7 pages.

3GPP TSG RAN WG1 #61, "Design Principles for UCI on PUSCH", R1-102631, May 10-14, 2010, Montreal, Canada; 4 pages.

3GPP TSG RAN WG1 #61, "Further Discussion on Data and Control Multiplexing in UL MIMO Transmissions", R1-103037, May 10-14, 2010, Montreal, Canada; 4 pages.

3GPP TSG RAN WG1 #61, "UCI Multiplexing on PUSCH for Rel-10 UL SU-MIMO", R1-103329, May 10-14, 2010, Montreal, Canada; 3 pages.

Canadian Intellectual Property Office, "Office Action," Application No. 2,796,310, Jan. 30, 2017, 4 pages, publisher CIPO, Gatineau, Canada.

Korean Intellectual Patent Office, "Notice of Preliminary Rejection," Application No. 10-2012-7026081, Feb. 8, 2017, 11 pages, publisher KIPO, Daejeon, Republic of Korea.

Texas Instruments, "Data and Control Mulitplexing for UL Multi-Antenna Transmission," R1-102108, 3GPP TSG RAN WG1 60bis, Beijing, China, Apr. 12-16, 2010, 4 pages.

ZTE, "UCI Multiplexing on PUSCH with MIMO Transmission," R1-101818, 3GPP TSG-RAN WG1 Meeting #60bis, Beijing, China, Apr. 12-16, 2010, 4 pages.

Notice of Final Rejection dated Apr. 25, 2017 in connection with Korean Application No. 10-2012-7026081, 7 pages

* cited by examiner

METHOD AND SYSTEM FOR MAPPING UPLINK CONTROL INFORMATION

CROSS-REFERENCE TO RELATED APPLICATION(S) AND PRIORITY CLAIM

This application is a continuation of U.S. Non-Provisional patent application Ser. No. 14/188,219 filed Feb. 24, 2014 and entitled "METHOD AND SYSTEM FOR MAPPING UPLINK CONTROL INFORMATION," now U.S. Pat. No. 8,995,555, which is a continuation of U.S. Non-Provisional patent application Ser. No. 13/071,284 filed Mar. 24, 2011 and entitled "METHOD AND SYSTEM FOR MAPPING UPLINK CONTROL INFORMATION," now U.S. Pat. No. 8,670,496, and claims priority to U.S. Provisional Patent Application No. 61/324,231 filed Apr. 14, 2010 and entitled "MULTIPLEXING OF CONTROL AND DATA IN AN UPLINK MIMO SYSTEM." The above-identified patent documents are hereby incorporated by reference into the present application.

TECHNICAL FIELD

The present application relates generally to wireless communications and, more specifically, to a method and system for indicating one or more enabled transport blocks.

BACKGROUND

In $3^{rd}$ Generation Partnership Project Long Term Evolution (3GPP LTE), Orthogonal Frequency Division Multiplexing (OFDM) is adopted as a downlink (DL) transmission scheme.

SUMMARY

An uplink grant transmitted to a subscriber station indicates a first modulation and coding scheme (MCS) value for a first codeword transmission and a second MCS value for a second codeword transmission. A multiple-input multiple-output (MIMO) uplink subframe received from the subscriber station has a first subset of layers used for first codeword transmission and a second subset of layers used for second codeword transmission. Rank indication (RI) information is mapped onto both the first subset of layers and the second subset of layers. Channel quality information (CQI) is only mapped onto either the first subset of layers or the second subset of layers. If the first MCS value is different from the second MCS value, the CQI is mapped onto the subset of layers having a higher MCS value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE terms "node B," "enhanced node B," and "eNodeB" are other terms for "base station" used below. Also, the LTE term "user equipment" or "UE" is another term for "subscriber station" used below.

Figure 1:
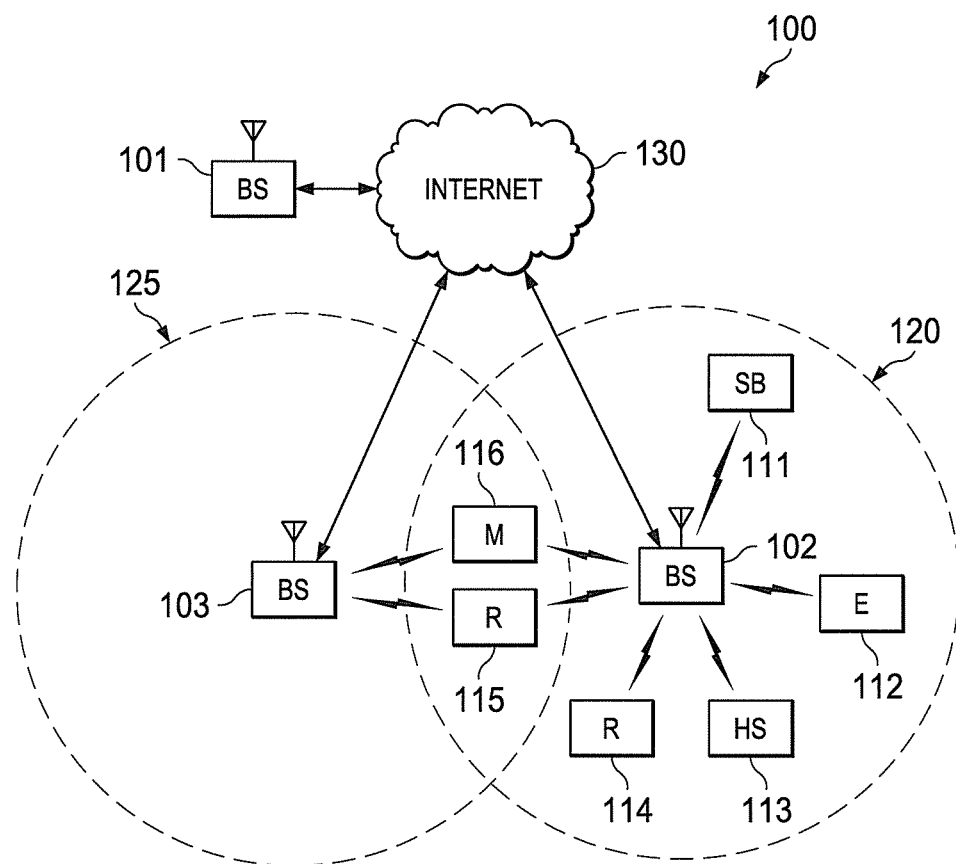
FIG. 1 illustrates an exemplary wireless network that transmits messages in the uplink according to the principles of this disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
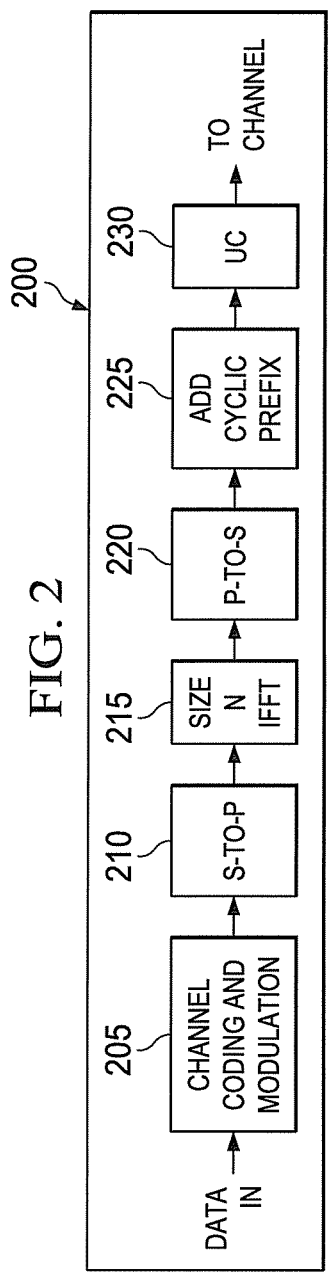
FIG. 2 is a high-level diagram of an orthogonal frequency division multiple access (OFDMA) transmitter according to one embodiment of this disclosure.
Figure 3:
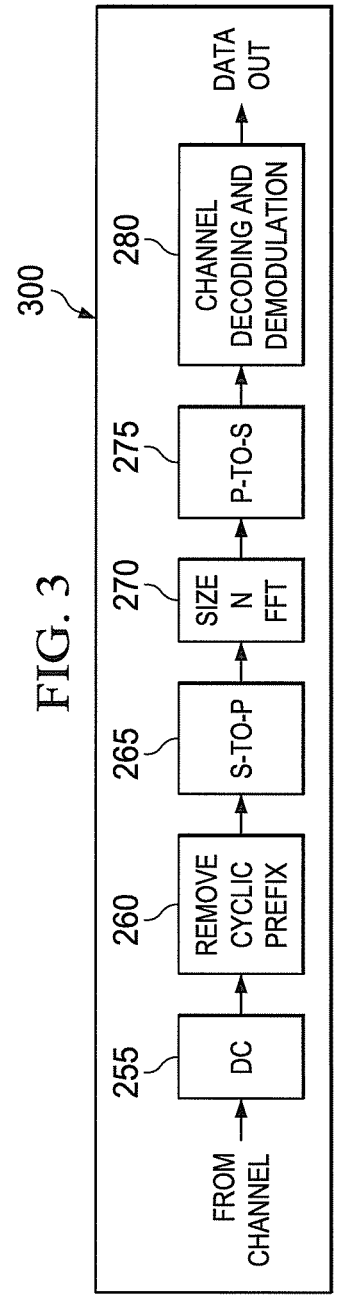
FIG. 3 is a high-level diagram of an OFDMA receiver according to one embodiment of this disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that, for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL} N_{SC}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{DL}$ and $N_{RB}^{max,DL}$ smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k.l) in a slot where $k=0, \ldots, N_{RB}^{DL} N_{SC}^{RB}-1$ and $l=0, \ldots, N_{symb}^{DL}-1$ are the indices in the frequency and time domains, respectively. Resource element (k.l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

Figure 4:
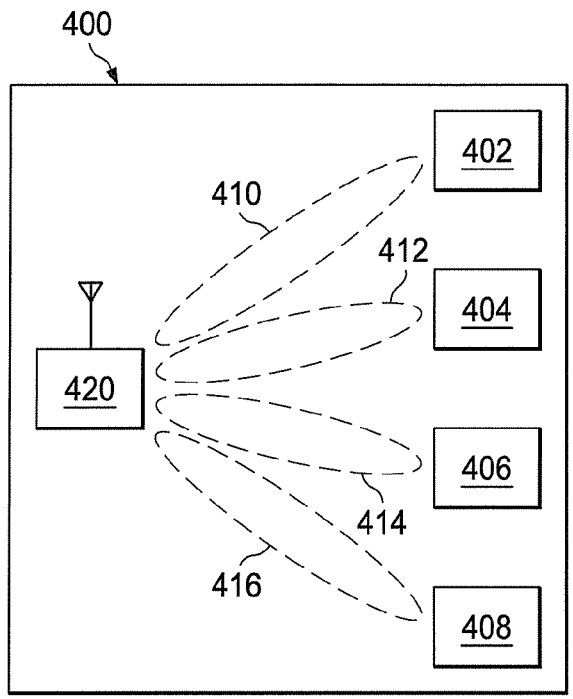
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

As shown in FIG. 4, base station 420 simultaneously communicates with multiple of mobile stations through the use of multiple antenna beams, each antenna beam is formed toward its intended mobile station at the same time and same frequency. Base station 420 and mobile stations 402, 404, 406, and 408 are employing multiple antennas for transmission and reception of radio wave signals. The radio wave signals can be Orthogonal Frequency Division Multiplexing (OFDM) signals.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of this disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to as downlink communication, and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data assistant (PDA), laptop, mobile telephone, handheld device, or any other device that is capable of receiving the beamformed transmissions.

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 5:
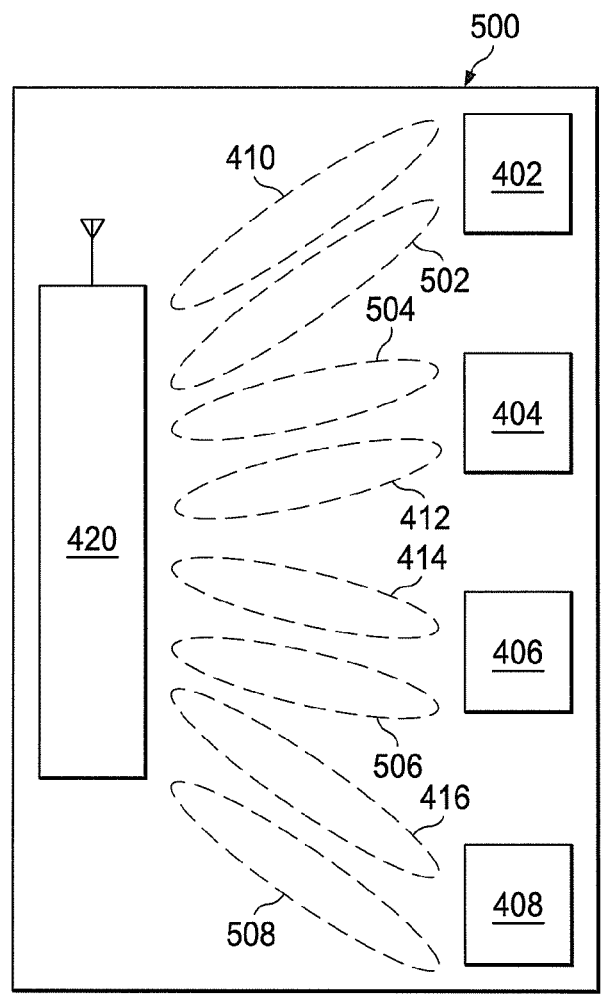
FIG. 5 illustrates a spatial division multiple access (SDMA) scheme according to an embodiment of this disclosure.

FIG. 5 illustrates an SDMA scheme according to an embodiment of this disclosure.

As shown in FIG. 5, base station 420 is equipped with 8 transmit antennas while mobile stations 402, 404, 406, and 408 are each equipped two antennas. In this example, base station 420 has eight transmit antennas. Each of the transmit antennas transmits one of beamformed signals 410, 502, 504, 412, 414, 506, 416, and 508. In this example, mobile station 402 receives beamformed transmissions 410 and 502, mobile station 404 receives beamformed transmissions 504 and 412, mobile station 406 receives beamformed transmissions 506 and 414, and mobile station 408 receives beamformed transmissions 508 and 416.

Since base station 420 has eight transmit antenna beams (each antenna beams one stream of data streams), eight streams of beamformed data can be formed at base station 420. Each mobile station can potentially receive up to 2 streams (beams) of data in this example. If each of the mobile stations 402, 404, 406, and 408 was limited to receive only a single stream (beam) of data, instead of multiple streams simultaneously, this would be multi-user beamforming (i.e., MU-BF).

Figure 6:
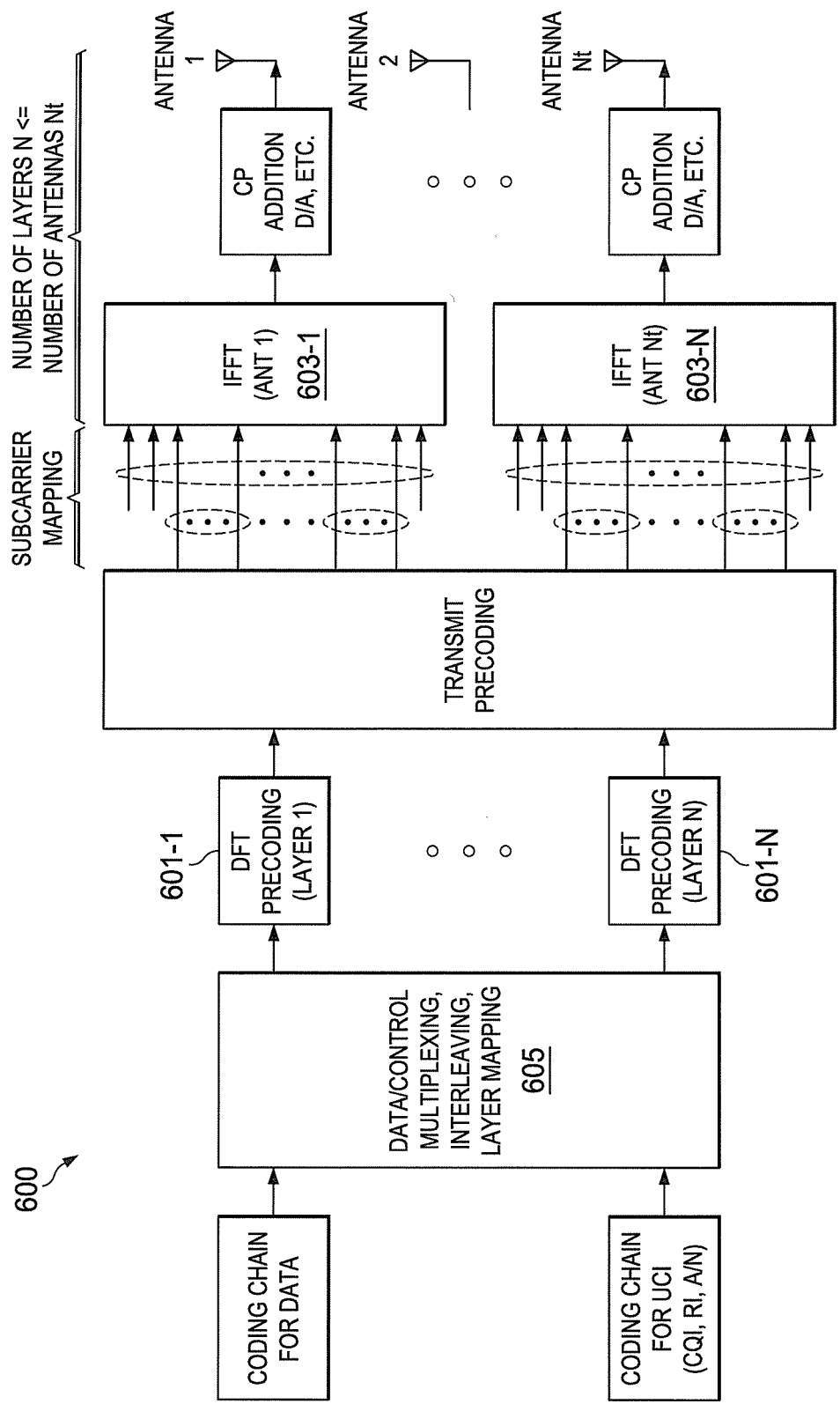
FIG. 6 illustrates a physical uplink shared channel (PUSCH) transmission chain according to an embodiment of this disclosure.

FIG. 6 illustrates a physical uplink shared channel (PUSCH) transmission chain 600 according to an embodiment of this disclosure.

FIG. 6 illustrates an N layer transmission on an Nt transmit antenna UE. FIG. 6 illustrates the mapping of the outputs of N Discrete Fourier Transform (DFT) precoding units 601-1 to 601-N to a contiguous set of subcarriers at inverse fast Fourier transform (IFFT) units 603-1 to 603-N.

One of the key components of the PUSCH transmission chain 600 is the data/control multiplexing function implemented in a data/control multiplexing unit 605, which is fully specified in 3GPP TS 36.212 v 8.5.0, "E-UTRA, Multiplexing and Channel Coding," December 2008, which is hereby incorporated by reference into the present application as if fully set forth herein.

The layer mapping is performed before DFT precoding, so that the data and control information are properly multiplexed and interleaved. The transmit precoding is performed between the DFT precoding units 601-1 to 601-N and the IFFT unit 603 to transform, on a per-subcarrier basic, an N dimension signal at the output of the DFT precoding units 601-1 to 601-N to an Nt dimensional signal as an input to the IFFT units 603-1 to 603-N. The subcarrier mapping at the input of the IFFT units 603-1 to 603-N can include non-contiguous segments of subcarriers.

In an embodiment of this disclosure, all the uplink control information (including CQI, RI and A/N bits) is carried on only one of the layers, with the following ways of choosing a particular layer for carrying the uplink control information. The total number of transmission layers is denoted as N.

If the modulation and coding scheme (MCS) used by the N layers are different, the layer that has the largest MCS value is selected to carry the uplink control information such as CQI, RI and A/N. The MCS values are typically carried in the UL schedule assignment grant (sent by the eNodeB to the UE) and, therefore, are known at the UE at the time of this data and control transmission. The control region size is defined as the number of resource elements.

If the MCS used by the N layers is the same, then the first layer is select to carry the uplink control information such as the CQI, RI and A/N. Such an embodiment could be suitable for situations where techniques such as layer mixing/layer permutation are used to ensure the same channel quality and, therefore, the same MCS values on all the layers.

This selection of a layer could also be explicitly signaled in the uplink scheduling grant as an additional control field, using either DCI format 0 or some other uplink grant DCI format.

In addition, the sizes of the three control regions (CQI, RI, A/N) are determined as a function of the corresponding UCI uplink control information (UCI) size, the MCS value associated with the layer on which the control regions are transmitted, and a higher layer signaled offset. The exact calculation of control region sizes is similar to what has already specified in 3GPP LTE standard 3GPP TS 36.212 v 8.5.0, "E-UTRA, Multiplexing and Channel coding", December 2008, which is hereby incorporated by reference into the present application as if fully set forth herein.

For example, if a single CW solution is used in the UL MIMO with layer permutation/mixing, meaning all the layers will have the same MCS, then the control region equation for HARQ and RI bits in section 5.2.2.6 of 3GPP LTE standard 3GPP TS 36.212 v 8.5.0, "E-UTRA, Multiplexing and Channel coding", December 2008 can be amended as shown in Equation 1 below:

$$Q' = \min\left(\left\lceil \frac{O \cdot M_{sc}^{PUSCH} \cdot N_{symb}^{PUSCH} \cdot \beta_{offset}^{PUSCH} \cdot N}{\sum_{n=1}^{N} \sum_{r=0}^{C(n)-1} K_{r,n}} \right\rceil, 4 \cdot M_{sc}^{PUSCH-current}\right), \quad [\text{Eqn. 1}]$$

Note the inclusion of the factor "N," which denotes the number of layers, in the numerator. The sum in the denominator will be over all code blocks (CBs) in all layers. Here C(n) denotes the number of CBs in layer n, and $K_{r,n}$ denotes the size of the rth CB in layer n. Similarly the control region equation for CQI bits is shown in Equation 2 below:

$$Q' = \min\left(\left\lceil \frac{(O+L) \cdot M_{sc}^{PUSCH} \cdot N_{symb}^{PUSCH} \cdot \beta_{offset}^{PUSCH} \cdot N}{\sum_{n=1}^{N} \sum_{r=0}^{C(n)-1} K_{r,n}} \right\rceil, M_{sc}^{PUSCH-current} \cdot N_{symb}^{PUSCH-current} - \frac{Q_{RI}}{Q_m}\right), \quad [\text{Eqn. 2}]$$

In another embodiment, if the MCS on the layers are different and the pth layer is selected to be the layer on which UCI is transmitted, then Equations 1 and 2 can be amended as shown in Equations 3 and 4, respectively, below:

$$Q' = \min\left(\left\lceil \frac{O \cdot M_{sc}^{PUSCH} \cdot N_{symb}^{PUSCH} \cdot \beta_{offset}^{PUSCH}}{\sum_{r=0}^{C(n)-1} K_{r,n}} \right\rceil, 4 \cdot M_{sc}^{PUSCH-current}\right), \quad [\text{Eqn. 3}]$$

for RI and A/N bits and $$Q' = \min\left(\left\lceil \frac{(O+L) \cdot M_{sc}^{PUSCH} \cdot N_{symb}^{PUSCH} \cdot \beta_{offset}^{PUSCH}}{\sum_{r=0}^{C(n)-1} K_{r,n}} \right\rceil, M_{sc}^{PUSCH-current} \cdot N_{symb}^{PUSCH-current} - \frac{Q_{RI}}{Q_m}\right), \quad [\text{Eqn. 4}]$$

for CQI bits.

In some embodiments of this disclosure, the uplink control information is mapped/allocated onto a subset of the N layers being transmitted on the uplink in a MIMO uplink subframe. The size of the subset, Ns, could be less than or equal to the total number of layers, which is denoted by N.

If the subset size Ns is less than N, i.e, Ns<N, then the layers used for uplink control transmission could be known at the UE according to one of the following methods.

For example, the subset of layers used for uplink control information could also be explicitly signaled in the uplink scheduling grant as an additional control field, using either DCI format 0 or some other uplink grant DCI format.

In another example, the subset of layers could be implicitly inferred by the UE according to (1) number of codewords; (2) codeword to layer mapping structure; and (3) the codeword that uses highest MCS value. For example, if N=4 and layer 1,2 are used for codeword 1 transmission while layer 3,4 are used for codeword 2 transmission, and if the MCS used by codeword 1 is better than the MCS used by codeword 2, then the UE can decide to transmit UL control information on layers 1&2, which corresponds to the layers with the better MCS.

In particular embodiments, the determination of the uplink control regions follows one of the following rules. Note that the subset of layers that contain control information is denoted as active layers.

Case 1. If the active layers used for UL control transmission have the same MCS, then the total size of each control region (CQI, RI, A/N) across the active layers is determined as a function of the corresponding UCI size and this single MCS value, and the control information is distributed evenly across the active layers, where each layer gets roughly 1/Ns of the total control region size. Such an embodiment could be suitable for situations where techniques such as layer mixing/layer permutation are used to ensure the same channel quality and, therefore, the same MCS values on all the layers.

Case 2. If the active layers have different MCS in their transmissions, then two alternatives apply.

Case 2a. For each active layer, a per-layer control region size is determined according to the UCI size and the MCS on that particular layer. The total size of the control region is the sum of the per-layer control region sizes over the active layers. The control information is then distributed to the active layers according to the per-layer control region size.

For case 2a, one example of determining the overall control region size can be given by amending Equations 1 and 2 as shown in Equations 5 and 6, respectively, below:

$$Q'(n) = \min\left(\left\lceil \frac{O \cdot M_{sc}^{PUSCH} \cdot N_{symb}^{PUSCH} \cdot \beta_{offset}^{PUSCH}}{\sum_{r=0}^{C(n)-1} K_{r,n}} \right\rceil, 4 \cdot M_{sc}^{PUSCH-current}\right),$$ [Eqn. 5]

for n=1, ... Ns, where Q'(n) is the number of RI and A/N symbols in the nth active layer, and $$Q'(n) = \min\left(\left\lceil \frac{(O+L) \cdot M_{sc}^{PUSCH} \cdot N_{symb}^{PUSCH} \cdot \beta_{offset}^{PUSCH}}{\sum_{r=0}^{C(n)-1} K_{r,n}} \right\rceil, M_{sc}^{PUSCH-current} \cdot N_{symb}^{PUSCH-current} - \frac{Q_{RI}(n)}{Q_m}\right),$$ [Eqn. 6]

where Q'(n) is the number of CQI symbols in the nth active layer, and $Q_{RI}(n)$ is the number of RI symbols allocated on this active layer.

Case 2b. The size of the total control region is jointly determined as a function of the UCI size and the MCSs on all active layers, and the control information is distributed evenly across all the active layers, where each layer gets roughly 1/Ns of the total control region size.

For both case 1 and case 2b, one example of determining the overall control region size can be given by amending Equations 1 and 2 as shown in Equations 7 and 8, respectively, below:

$$Q' = \min\left(\left\lceil \frac{O \cdot M_{sc}^{PUSCH} \cdot N_{symb}^{PUSCH} \cdot \beta_{offset}^{PUSCH} \cdot Ns}{\sum_{n=1}^{Ns} \sum_{r=0}^{C(n)-1} K_{r,n}} \right\rceil, 4 \cdot M_{sc}^{PUSCH-current} \cdot Ns\right),$$ [Eqn. 7]

for RI and A/N bits. Note the first summation on the denominator is summed over all active layers.

$$Q' = \min\left(\left\lceil \frac{(O+L) \cdot M_{sc}^{PUSCH} \cdot N_{symb}^{PUSCH} \cdot \beta_{offset}^{PUSCH} \cdot Ns}{\sum_{n=1}^{Ns} \sum_{r=0}^{C(n)-1} K_{r,n}} \right\rceil, M_{sc}^{PUSCH-current} \cdot N_{symb}^{PUSCH-current} \cdot Ns - \frac{Q_{RI}}{Q_m}\right),$$ [Eqn. 8]

for CQI bits.

Furthermore, the UCI symbols can be ensured to be evenly distributed across all active layers. Let $$Q'' = Ns \cdot \left\lceil \frac{Q'}{Ns} \right\rceil,$$

and use Q" as the total number of UCI symbols. A total of Q"−Q' null filler symbols are added to ensure the correctness of rate matching.

This disclosure describes systems and methods of simultaneously transmitting data and control information such as CQI (channel quality information), RI (rank information), A/N (Ack/Nack information) when the MIMO scheme is used in the uplink communication. The systems and methods of this disclosure may be applied to uplink control information generated for a single component carrier or multiple component carriers in the case of carrier aggregation in systems such as LTE-advanced. In this disclosure, the three types of uplink control information are generally denoted as UCI.

In an embodiment of this disclosure, the uplink control information or UCI is mapped or allocated onto a subset of N layers being transmitted on the uplink in a MIMO uplink subframe. This subset of layers is implicitly inferred by the UE according to (1) the number of codewords (CWs); (2) the codeword to layer mapping structure; and (3) the codeword that uses the highest modulation and coding scheme (MCS) value. For example, if N=4 and layers 1,2 are used for codeword 1 transmission while layers 3,4 are used for codeword 2 transmission, and if the MCS used by codeword 1 is better than the MCS used by codeword 2, then the UE decides to transmit the UCI on layers 1 and 2, which correspond to the layers with the better MCS value.

Therefore, for a one CW transmission, the UCI is mapped onto the layers of that CW. For a two CWs transmission with different MCS values indicated by the UL grant, the UCI is mapped onto the layers of the CW having the higher MCS value.

In further embodiments, for the case of two codewords having the same the same MCS value, the following approaches are proposed:

In a first approach, the UE always maps the UCI onto the layers of the CW0 (codeword0 or the first codeword). The CW0 is mapped to either layer 0 or layers 0 and 1 according to the CW to layer mapping table and transmission rank.

In a second approach, the UE always maps the UCI onto the layers of the CW1 (codeword1 or the second codeword).

In a third approach, the UE maps the UCI onto the layers of the CW1 for the case of rank 3 (3 layers) transmission, and maps the UCI onto the layers of the CW0 for other rank transmissions. The reason for the special treatment for rank 3 is that in rank3, CW0 is mapped to layer 0, and CW1 is mapped to layers 1 and 2. It may be better to map the UCI onto the layers of the CW with 2-layer transmission since this provides more resources for UCI transmission.

In some embodiments of this disclosure, some types of UCI are mapped onto a subset of the N layers being transmitted on the uplink in a MIMO uplink subframe, while other types of UCI are mapped onto all the N layers.

The types of UCIs that need more reliable reception at the eNodeB are mapped onto all the N layers.

Some examples of a subset of N layers carrying certain types of UCI are:
  all the layers in CW0;
  all the layers in CW1;
  all the layers in a CW having the higher MCS; and
  the smallest numbered layer in a CW having the higher MCS.

Figure 7:
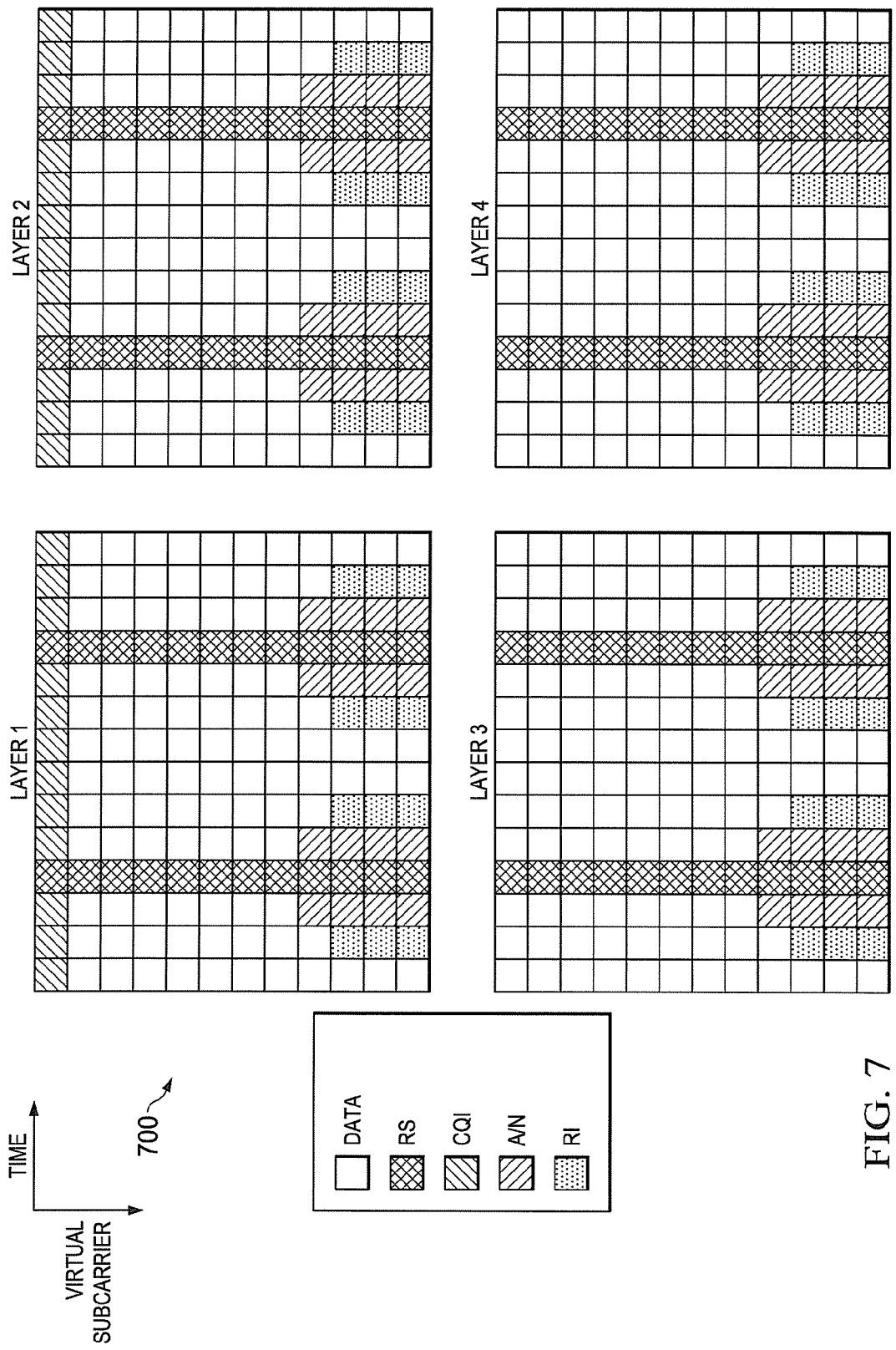
FIG. 7 illustrates a mapping of uplink control information onto a plurality of layers of two codewords according to an embodiment of this disclosure.

FIG. 7 illustrates a mapping 700 of uplink control information onto a plurality of layers of two codewords according to an embodiment of this disclosure.

In some embodiments, acknowledgement/negative acknowledgement (ACK/NACK) information and rank indication (RI) information are mapped onto all the N layers corresponding to both codewords, while channel quality information (CQI) is mapped onto a subset of N layers corresponding to only one of the codewords. For example, as shown in FIG. 7, layers 1 and 2 correspond to a first codeword, and layers 3 and 4 correspond to a second codeword. CQI is mapped onto layers 1 and 2 corresponding to the first codeword, while ACK/NACK information and RI information are mapped onto all 4 layers corresponding to both codewords, in a 4-layer uplink transmission. In particular embodiments, the CQI is mapped to the smallest numbered layer in a CW having the higher MCS.

In other embodiments, RI is mapped onto all the N layers of the codeword, while ACK/NACK and CQI are mapped onto a subset of the N layers of the codeword.

In further embodiments, ACK/NACK is mapped onto all the N layers of the codeword, while RI and CQI are mapped onto a subset of the N layers of the codeword.

Figure 8:
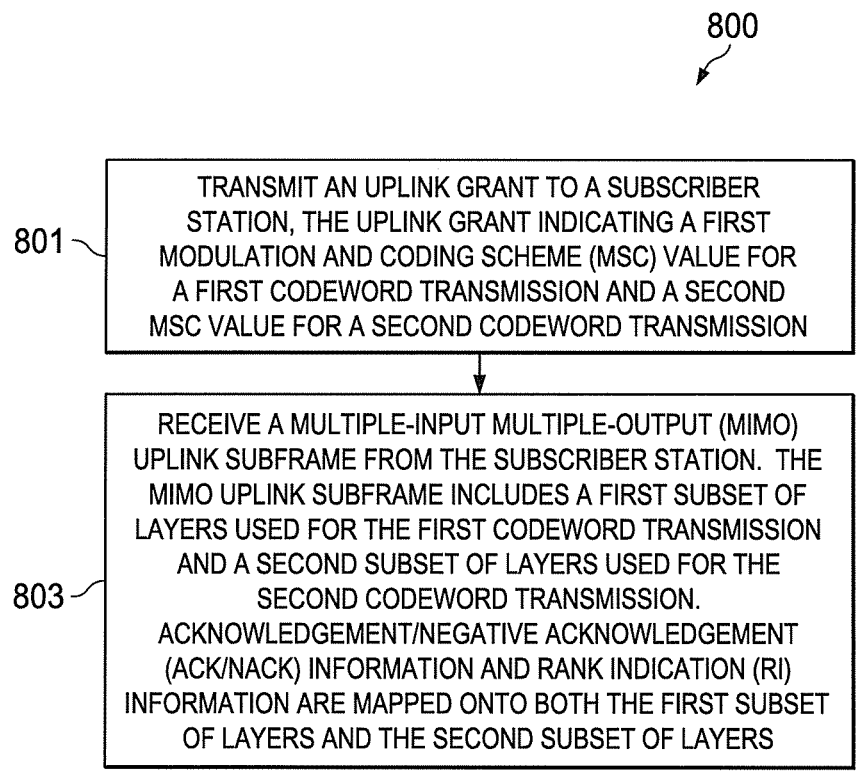
FIG. 8 illustrates a method of operating a base station according to an embodiment of this disclosure.

FIG. 8 illustrates a method 800 of operating a base station according to an embodiment of this disclosure.

As shown in FIG. 8, method 800 includes transmitting an uplink grant to a subscriber station, the uplink grant indicating a first modulation and coding scheme (MCS) value for a first codeword transmission and a second MCS value for a second codeword transmission (block 801). Method 800 also includes receiving a multiple-input multiple-output (MIMO) uplink subframe from the subscriber station (block 803). The MIMO uplink subframe includes a first subset of layers used for the first codeword transmission and a second subset of layers used for the second codeword transmission. Acknowledgement/negative acknowledgement (ACK/NACK) information and rank indication (RI) information are mapped onto both the first subset of layers and the second subset of layers. Channel quality information (CQI) is only mapped onto either the first subset of layers or the second subset of layers. In some embodiments, if the first MCS value is different from the second MCS value, the CQI is mapped onto the subset of layers having a higher MCS value. In other embodiments, if the first MCS value is the same as the second MCS value, the CQI is mapped onto the first subset of layers used for the first codeword transmission.

Figure 9:
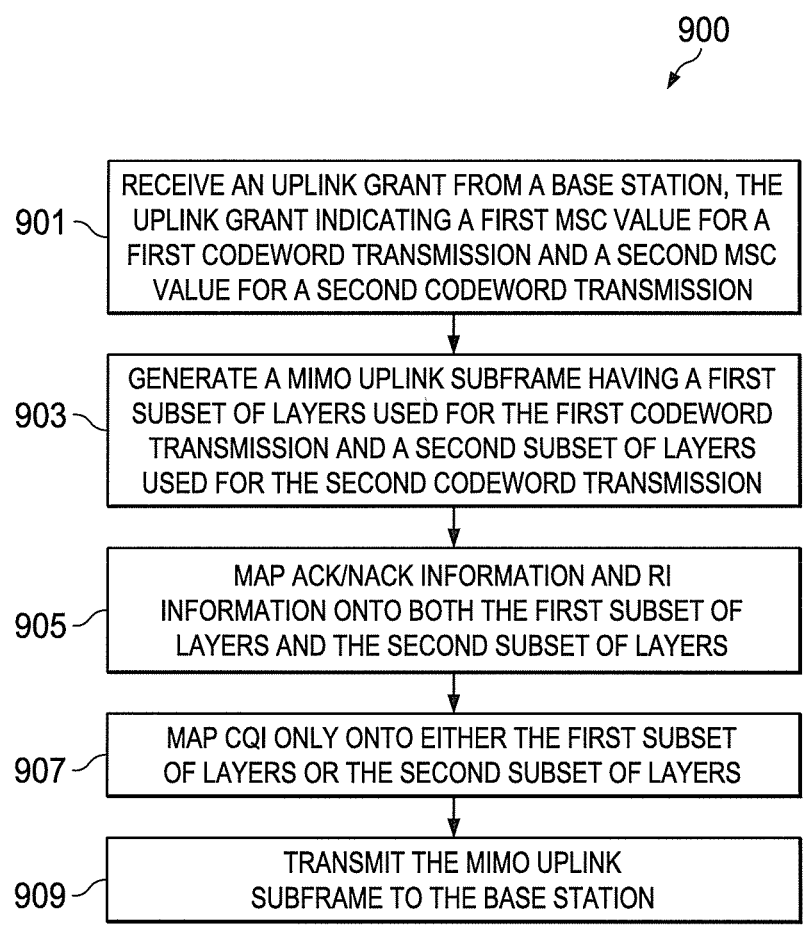
FIG. 9 illustrates a method of operating a subscriber station according to an embodiment of this disclosure.

FIG. 9 illustrates a method 900 of operating a subscriber station according to an embodiment of this disclosure.

As shown in FIG. 9, method 900 includes receiving an uplink grant from a base station, the uplink grant indicating a first modulation and coding scheme (MCS) value for a first codeword transmission and a second MCS value for a second codeword transmission (block 901). Method 900 also includes generating a multiple-input multiple-output (MIMO) uplink subframe having a first subset of layers used for the first codeword transmission and a second subset of layers used for the second codeword transmission (block 903). Method 900 further includes mapping acknowledgement/negative acknowledgement (ACK/NACK) information and rank indication (RI) information onto both the first subset of layers and the second subset of layers (block 905) and mapping channel quality information (CQI) only onto either the first subset of layers or the second subset of layers (block 907). Method 900 yet further includes transmitting the MIMO uplink subframe to the base station (block 909). In some embodiments, if the first MCS value is different from the second MCS value, the CQI is mapped onto the subset of layers having a higher MCS value. In other embodiments, if the first MCS value is the same as the second MCS value, the CQI is mapped onto the first subset of layers used for the first codeword transmission.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station, comprising:
  a transmit path circuitry configured to transmit an uplink grant to a subscriber station, the uplink grant indicating a first modulation and coding scheme (MCS) value for a first codeword transmission and a second MCS value for a second codeword transmission; and
  a receive path circuitry configured to receive a multiple-input multiple-output (MIMO) uplink subframe from the subscriber station, the MIMO uplink subframe having a first subset of layers used for the first codeword transmission and a second subset of layers used for the second codeword transmission,
  wherein rank indication (RI) information is mapped onto both the first subset of layers and the second subset of layers, and channel quality information (CQI) is mapped onto either the first subset of layers or the second subset of layers, and
  wherein if the first MCS value is different from the second MCS value, the CQI is mapped onto the subset of layers having a higher MCS value.

2. The base station of claim 1, wherein acknowledgement/negative acknowledgement (ACK/NACK) information is mapped onto both the first subset of layers and the second subset of layers.

3. The base station of claim 1, wherein if the first MCS value is the same as the second MCS value, the CQI is mapped onto the first subset of layers used for the first codeword transmission.

4. The base station of claim 3, wherein the first subset of layers used for the first codeword transmission consists of layer 0.

5. The base station of claim 3, wherein the first subset of layers used for the first codeword transmission consists of layers 0 and 1.

6. A method of operating a base station, the method comprising:
- transmitting an uplink grant to a subscriber station, the uplink grant indicating a first modulation and coding scheme (MCS) value for a first codeword transmission and a second MCS value for a second codeword transmission; and
- receiving a multiple-input multiple-output (MIMO) uplink subframe from the subscriber station, the MIMO uplink subframe having a first subset of layers used for the first codeword transmission and a second subset of layers used for the second codeword transmission,
- wherein rank indication (RI) information is mapped onto both the first subset of layers and the second subset of layers, and channel quality information (CQI) is mapped onto either the first subset of layers or the second subset of layers, and
- wherein if the first MCS value is different from the second MCS value, the CQI is mapped onto the subset of layers having a higher MCS value.

7. The method of claim 6, wherein acknowledgement/negative acknowledgement (ACK/NACK) information is mapped onto both the first subset of layers and the second subset of layers.

8. The method of claim 6, wherein if the first MCS value is the same as the second MCS value, the CQI is mapped onto the first subset of layers used for the first codeword transmission.

9. The method of claim 8, wherein the first subset of layers used for the first codeword transmission consists of layer 0.

10. The method of claim 8, wherein the first subset of layers used for the first codeword transmission consists of layers 0 and 1.

11. A subscriber station, comprising:
- a receive path circuitry configured to receive an uplink grant from a base station, the uplink grant indicating a first modulation and coding scheme (MCS) value for a first codeword transmission and a second MCS value for a second codeword transmission; and
- a transmit path circuitry configured to:
  - generate a multiple-input multiple-output (MIMO) uplink subframe having a first subset of layers used for the first codeword transmission and a second subset of layers used for the second codeword transmission,
  - map rank indication (RI) information onto both the first subset of layers and the second subset of layers,
  - map channel quality information (CQI) onto either the first subset of layers or the second subset of layers,
  - wherein if the first MCS value is different from the second MCS value, the CQI is mapped onto the subset of layers having a higher MCS value, and transmit the MIMO uplink subframe to the base station.

12. The subscriber station of claim 11, wherein acknowledgement/negative acknowledgement (ACK/NACK) information is mapped onto both the first subset of layers and the second subset of layers.

13. The subscriber station of claim 11, wherein if the first MCS value is the same as the second MCS value, the transmit path circuitry is configured to map the CQI onto the first subset of layers used for the first codeword transmission.

14. The subscriber station of claim 13, wherein the first subset of layers used for the first codeword transmission consists of layer 0.

15. The subscriber station of claim 13, wherein the first subset of layers used for the first codeword transmission consists of layers 0 and 1.

16. A method of operating a subscriber station, the method comprising:
- receiving an uplink grant from a base station, the uplink grant indicating a first modulation and coding scheme (MCS) value for a first codeword transmission and a second MCS value for a second codeword transmission;
- generating a multiple-input multiple-output (MIMO) uplink subframe having a first subset of layers used for the first codeword transmission and a second subset of layers used for the second codeword transmission;
- mapping rank indication (RI) information onto both the first subset of layers and the second subset of layers;
- mapping channel quality information (CQI) onto either the first subset of layers or the second subset of layers, wherein if the first MCS value is different from the second MCS value, the CQI is mapped onto the subset of layers having a higher MCS value; and
- transmitting the MIMO uplink subframe to the base station.

17. The method of claim 16, wherein acknowledgement/negative acknowledgement (ACK/NACK) information is mapped onto both the first subset of layers and the second subset of layers.

18. The method of claim 16, wherein if the first MCS value is the same as the second MCS value, the CQI is mapped onto the first subset of layers used for the first codeword transmission.

19. The method of claim 18, wherein the first subset of layers used for the first codeword transmission consists of layer 0.

20. The method of claim 18, wherein the first subset of layers used for the first codeword transmission consists of layers 0 and 1.

* * * * *